United States Patent
Lindbom et al.

(10) Patent No.: US 8,400,905 B2
(45) Date of Patent: Mar. 19, 2013

(54) GENERATION OF MBSFN-DOB SYNCHRONIZATION CODES

(75) Inventors: Lars Lindbom, Karlstad (SE); Dirk Gerstenberger, Stockholm (SE); Yi-Pin Eric Wang, Fremont, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 304 days.

(21) Appl. No.: 12/808,784

(22) PCT Filed: Sep. 18, 2008

(86) PCT No.: PCT/SE2008/000518
§ 371 (c)(1),
(2), (4) Date: Jun. 17, 2010

(87) PCT Pub. No.: WO2009/082316
PCT Pub. Date: Jul. 2, 2009

(65) Prior Publication Data
US 2012/0014307 A1 Jan. 19, 2012

Related U.S. Application Data

(60) Provisional application No. 61/016,192, filed on Dec. 21, 2007, provisional application No. 61/006,356, filed on Jan. 8, 2008.

(51) Int. Cl.
*H04H 20/71* (2008.01)
(52) U.S. Cl. .......... 370/203; 370/342; 370/476
(58) Field of Classification Search .......... None
See application file for complete search history.

(56) References Cited

U.S. PATENT DOCUMENTS

| 6,771,615 B1 | 8/2004 | Park et al. |
| 7,010,071 B1 | 3/2006 | Michel et al. |
| 7,039,036 B1 | 5/2006 | Dabak et al. |
| 7,711,032 B2 | 5/2010 | Diaz Fuente |
| 2005/0254466 A1 | 11/2005 | Rudolf et al. |

FOREIGN PATENT DOCUMENTS

| EP | 1443669 A1 | 8/2004 |
| EP | 1843501 A1 | 10/2007 |
| RU | 2280957 C2 | 7/2006 |
| RU | 2295778 C1 | 3/2007 |

(Continued)

OTHER PUBLICATIONS

3rd Generation Partnership Project. "On MBSFN DOB Synchronization." TSG-RAN WG1 #51bis, R1-080415, Sevilla, Spain, Jan. 14-18, 2008.

(Continued)

*Primary Examiner* — Kevin C Harper
*Assistant Examiner* — Samina Choudhry
(74) *Attorney, Agent, or Firm* — Coats & Bennett, P.L.L.C.

(57) ABSTRACT

Physical downlink channels PPHY1, PHY2 are summed in a summation unit 10. The output of summation unit 10 is forwarded to another summation unit 12, where it is combined with the primary and secondary synchronization channels P-SCH, S-SCH. The secondary synchronization channel S-SCH is formed as in WCDMA. The primary synchronization channel P-SCH is formed by connecting a switch SW either to a code generator 14 generating the conventional code PSCWCDMA or a code generator 18 generating the code PSCNEW. The selection is controlled by a PSC controller 18. This controller can be adapted to produce a P-SCH in accordance with one of several formats. PSCNEW has the properties that it is a hierarchical Golay sequence constructed by a plurality of constituent sequences with at least one of the constituent sequences being the Golay sequence, and that it is orthogonal to the primary and secondary synchronization codes used in non-MBSFN capable WCDMA.

12 Claims, 4 Drawing Sheets

FOREIGN PATENT DOCUMENTS

| WO | 0051392 A1 | 8/2000 |
|----|------------|--------|
| WO | 0054424 A2 | 9/2000 |
| WO | 0067404 A1 | 11/2000 |
| WO | 0067405 A1 | 11/2000 |

OTHER PUBLICATIONS

3rd Generation Partnership Project. "Support for MBSFN DOB Operations." 3GPP TSG-RAN 1 Meeting #50, R1-073792, Athens, Greece, Aug. 20-24, 2007.

3rd Generation Partnership Project. "Support for MBSFN DOB Operations." 3GPP TSG-RAN1 Meeting #50, R1-073790, Athens, Greece, Aug. 20-24, 2007.

3rd Generation Partnership Project. 3GPP TS 25.223, V7.5.0 (Sep. 2007). 3rd Generation Partnership Project, Technical Specification Group Radio Access Network; Spreading and modulation (TDD) (Release 7). Sep. 2007.

3rd Generation Partnership Project. 3GPP TS 25.221, V7.4.0 (Sep. 2007). 3rd Generation Partnership Project, Technical Specification Group Radio Access network; Physical channels and mapping of transport channels onto physical channels (TDD) (Release 7). Sep. 2007.

3rd Generation Partnership Project. 3GPP TS 25.213, V7.3.0 (Sep. 2007). 3rd Generation Partnership Project; Technical Specification Group Radio Access Network; Spreading and modulation (FDD) (Release 7). Sep. 2007.

RU Decision to Grant issued Oct. 22, 2012 in re RU Application No. 2010130539/07(043310) filed Sep. 18, 2008.

… (1)

GENERATION OF MBSFN-DOB SYNCHRONIZATION CODES

TECHNICAL FIELD

The present invention relates generally to MBSFN (Multicast Broadcast Single Frequency Network) DOB (Downlink Optimized Broadcast) cell search and generation of primary synchronization codes.

BACKGROUND

MBMS (Multimedia Broadcast Multicast Service) over single frequency networks (MBSFN) has recently been specified in 3GPP for Rel-7 UMTS Terrestrial Radio Access (UTRA) systems. The MBSFN feature provides significantly higher spectral efficiency compared to Rel-6 MBMS and is primarily intended for broadcasting high bit rate demanding Mobile TV services on dedicated MBMS carriers. Since it is broadcast only, MBSFN inherently targets transmissions in unpaired frequency bands.

In SFN (Single Frequency Network) transmission, multiple base stations transmit the same waveform at the same time such that a terminal receives signals from all base stations, resulting in a behavior similar to one large cell. For UTRA systems, SFN transmission implies that a cluster of time synchronized NodeBs transmit the same content using the same channelization and scrambling codes.

SFN transmission is illustrated in FIG. 1, where a terminal, or mobile station MS, receives signals from two base stations BS1 and BS2. When using cell-specific scrambling, transmissions from the right hand side base station BS2 would represent inter-cell interference for the terminal in the adjacent cell. In a single frequency network, on the other hand, inter-cell interference shows up as additional multi-path transmission, which can be accounted for by the terminal receiver as a desired signal, resulting in considerably improved coverage.

MBSFN enhances the Rel-6 MBMS physical layers by supporting SFN operations for MBMS point-to-multipoint (ptm) transmissions on a dedicated MBMS carrier. It also supports higher service bit rates and efficient time division multiplexing of services for reducing terminal battery consumption by allowing discontinuous reception (DRX) of services. MBSFN uses the same type of channels as used for Rel-6 MBMS ptm transmissions.

In order to provide smooth integration of the MBSFN feature to any existing UTRA system, MBSFN has been specified for both FDD (Frequency Division Duplex) and TDD (Time Division Duplex) based physical layer downlink (DL) channel structures:
  MBSFN based on WCDMA (Wideband Code Division Multiple Access) (FDD based)
  MBSFN based on TD-SCDMA (Time Division-Synchronous Code Division Multiple Access) (TDD based)
  MBSFN based on TD-CDMA (Time Division-Code Division Multiple Access) (TDD based)

The FDD related MBSFN uses the WCDMA downlink common physical layer channels for transmission of data, and no paired uplink transmissions occur. For the TDD related MBSFN, all slots are used for downlink transmissions when networks are optimized for broadcast. Hence, no duplex occurs in MBSFN and the differences between FDD and TDD based MBSFN then mainly refer to the physical layer slot formats, the way Mobile TV services are time multiplexed and the chip rates in the case of the TDD options TD-SCDMA and 7.68 Mcps TD-CDMA. (The chip rate for the third TDD option, 3.84 Mcps TD-CDMA, is the same as used in FDD.)

When transmitting downlink in all slots, the meaning of TDD and FDD becomes blurred in the sense that no duplex occurs in broadcast. As mentioned above, the difference then basically refers to the construction of the common downlink physical channels. Therefore, in an ongoing 3GPP work item [1] the objective is to specify the WCDMA based MBSFN approach as an additional TDD option, in which all slots are dedicated for broadcast. This additional TDD option has been referred to as MBSFN Downlink Optimized Broadcast (DOB). The MBSFN DOB fulfils relevant TDD RF requirements.

In cell search, the SCH (Synchronization CHannel) is used by a terminal to determine slot and radio frame synchronization as well as to identify the group code of a cell. Given the group code of the cell, the terminal can detect the cell-specific scrambling code (and midamble code in case of TDD). The cell search procedure is normally divided into three steps:
  1. Slot synchronization
  2. Frame synchronization and code group identification
  3. Cell-specific scrambling code detection The synchronization channel consists of two sub-channels, the Primary SCH and the Secondary SCH, see [2],[3]:
  The Primary SCH is formed by a modulated code, the Primary Synchronization Code (PSC). This code is the same for all cells in the system. With e.g. a receive filter matched to the PSC, the terminal can locate the slot timing of the cell by detecting peaks in the matched filter output.
  The Secondary SCH is formed by a repeatedly transmitted sequence of modulated codes, the Secondary Synchronization Codes (SSC), and is transmitted in parallel with the Primary SCH. The SSC indicates which of the code groups the cell-specific scrambling code belongs to and the SSC also provides the possibility to obtain frame synchronization.

In WCDMA, and 3.84 Mcps TD-CDMA systems, the 10 ms radio frames of the synchronization channels are divided into 15 slots, each of length 2560 chips. The PSC and SSC have a length of 256 chips and the mechanism to generate these synchronization codes is the same for WCDMA and 3.84 Mcps TD-CDMA, but the allocation of the codes within the frame differs.

In the case of WCDMA, the synchronization codes are allocated in each slot as illustrated by FIG. 2, whereas in TD-CDMA there are two possible allocations of the SCH codes within the frame:
  1. In slot #k, where k=0 . . . 14
  2. In two slots, #k and #k+8, where k=0 . . . 6

In WCDMA, the PSC and SSC are always allocated in the beginning of the slots, as illustrated in FIG. 2, whereas in TD-CDMA a time offset can be applied to the PSC. Furthermore, in WCDMA the Secondary SCH is formed by one sequence of SSC, whereas in TD-CDMA three SSC sequences are transmitted in parallel.

When deploying MBSFN based on WCDMA common downlink channels in UMTS unpaired frequency bands (i.e. MBSFN DOB in TDD bands), there might be some impact on roaming legacy (older) TD-CDMA terminals with respect to cell search at power-on. A legacy TD-CDMA terminal that expects to find synchronization codes in at most two slots per frame could experience longer cell search times (depending on the particular implementation), due to the deployment of the WCDMA based synchronization channel structure in the unpaired spectrum. It may have to evaluate 15 positions within a frame in order to find out that it actually cannot access the MBSFN DOB carrier.

A WCDMA (and non-MBSFN capable) terminal trying to access an MBSFN DOB carrier performs the cell search steps and then reads system information on the broadcast channel (BCH) to find out that this carrier is barred. In this case, however, the WCDMA terminal may not try to perform the cell search in unpaired frequency bands, due to pre-knowledge of their spectrum locations. On the other hand, reading a barred cell may delay the cell search at power on for a roaming WCDMA and non-MBSFN capable terminal trying to access unpaired bands.

SUMMARY

An object of the present invention is to improve cell search for non-MBSFN capable terminals in an MBSFN DOB system.

This object is achieved in accordance with the attached claims.

Briefly, the present invention is based on a new PSC, denoted $C_{psc,new}$, for MBSFN having the following properties:

$C_{psc,new}$ is a hierarchical Golay sequence constructed by a plurality of constituent sequences with at least one of the constituent sequences being the Golay sequence.

$C_{psc,new}$ is orthogonal to the PSC and SSC used in non-MBSFN capable WCDMA.

The new PSC may be used to generate a new synchronization channel structure for MBSFN, in which the new PSC is allocated to predetermined time slots of frames and PSCs used in non-MBSFN capable WCDMA are allocated to any remaining time slots of the frames.

An MBSFN capable base station includes means adapted to generate such a synchronization channel frame that includes the new primary synchronization code.

BRIEF DESCRIPTION OF THE DRAWINGS

The invention, together with further objects and advantages thereof, may best be understood by making reference to the following description taken together with the accompanying drawings, in which.

DETAILED DESCRIPTION

Figure 1:
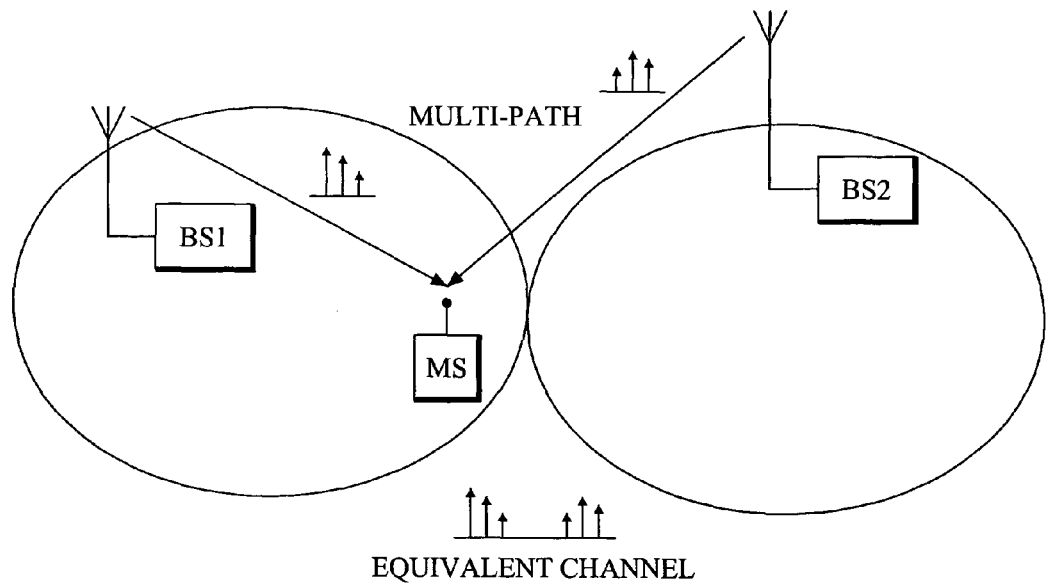
FIG. 1 is a diagram illustrating the SFN principle.
Figure 2:
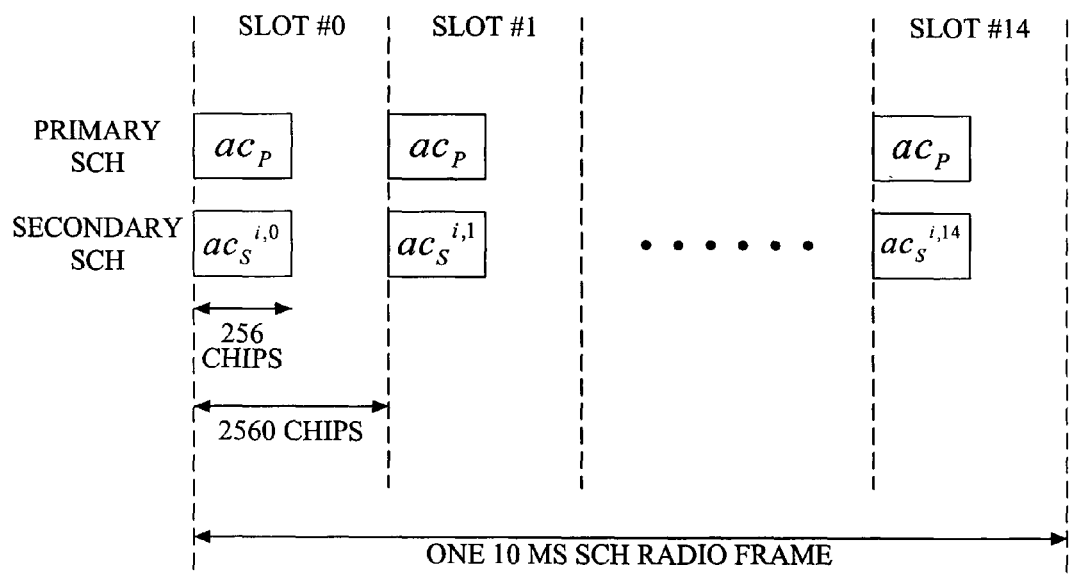
FIG. 2 is a diagram illustrating the structure of the WCDMA synchronization channel.
Figure 3:
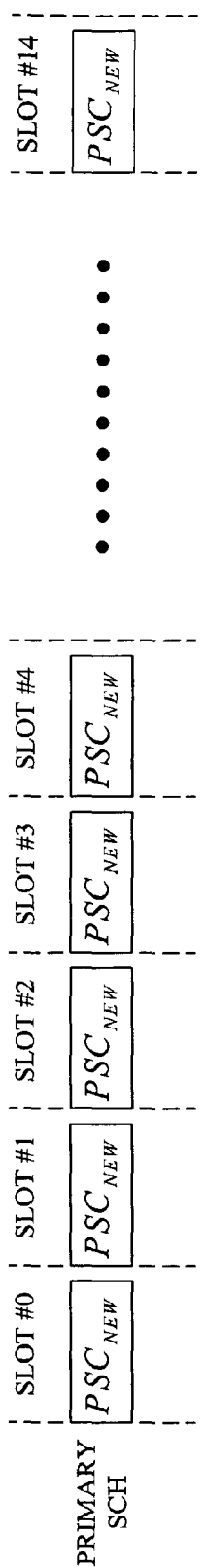
FIG. 3 is a diagram illustrating the structure of an embodiment of the primary synchronization channel in accordance with the present invention.

In a first embodiment, illustrated in FIG. 3, the Primary SCH sent on the MBSFN DOB carrier is modulated by a new PSC. The new PSC is orthogonal to the PSC and SSC specified for WCDMA and TD-CDMA. Due to the orthogonality and low cross-correlation properties, MBSFN DOB carriers (cells) are not observable for any non-MBSFN DOB capable terminals. The Secondary SCH sent on the MBSFN DOB carrier is the same as specified for WCDMA and no time offsets are applied to the synchronization codes.

Figure 4:
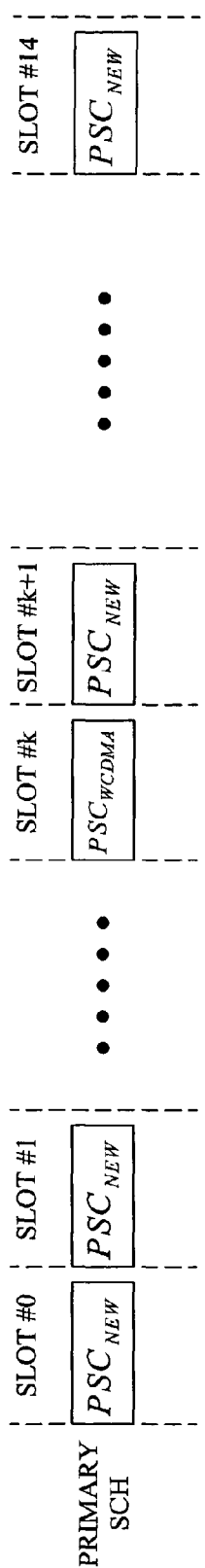
FIG. 4 is a diagram illustrating the structure of an example of another embodiment of the primary synchronization channel in accordance with the present invention.
Figure 5:
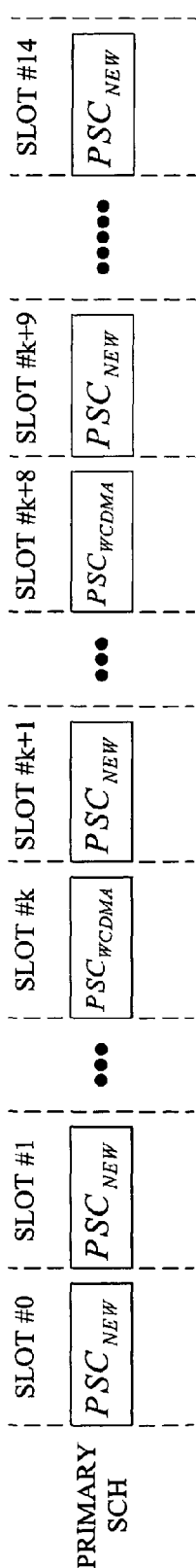
FIG. 5 is a diagram illustrating the structure of an example of still another embodiment of the primary synchronization channel in accordance with the present invention.

In further embodiments, illustrated in FIGS. 4 and 5, the Primary SCH sent on the MBSFN DOB carrier is in one slot, or possibly in two slots, of a frame modulated by the PSC specified for WCDMA ($PSC_{WCDMA}$) and in the remaining slots of the frame modulated by the new PSC ($PSC_{NEW}$), i.e.

1. If $PSC_{WCDMA}$ is allocated in slot #k, where k=0 . . . 14, then $PSC_{NEW}$ is allocated in slots not equal to #k of the frame (FIG. 4).
2. If $PSC_{WCDMA}$ is allocated in slots #k and #k+8, where k=0 . . . 6, then $PSC_{NEW}$ is allocated in slots not equal to #k and #k+8 of the frame (FIG. 5).

No time offset is applied to $PSC_{WCDMA}$ and $PSC_{NEW}$, and thus they always start at the beginning of slots associated with the Primary SCH.

In another embodiment, the Secondary SCHs sent on the MBSFN DOB carrier is constructed as in FDD and TDD 3.84 Mcps option, but with the constituent sequence a defined in [2], [3] replaced with the corresponding constituent sequence used to construct the new PSC (procedure described below).

With the above slot arrangement of the primary synchronization codes $PSC_{WCDMA}$ and $PSC_{NEW}$, a legacy TD-CDMA terminal trying to access an MBSFN DOB carrier will find at most two peaks within a frame when correlating receive signals (matched filter output) with its primary synchronization code. In this case, the cell search time will not be longer than for a legacy TD-CDMA terminal trying to access an MBSFN TD-CDMA carrier.

The new PSC, denoted $C_{psc,new}$ in the mathematical description below, of length 256 chips is constructed as follows: The new sequence can be constructed from two constituent sequences $x_{1,new}$ and $x_{2,new}$, each of length 16 chips, in accordance with:

$$y(i)=x_{2,new}(i \bmod 16)*x_{1,new}(i \text{ div } 16), i=0 \ldots$$
$$255 C_{psc,new}=p*\langle y(0), y(1), \ldots, y(255) \rangle \quad (1)$$

where p denotes a phase rotation represented by a complex number, for example $p=(1+j)$.

The constituent sequence $x_{1,new}$ is chosen as a Golay complementary sequence to the corresponding constituent sequence $x_1$ associated with the PSC defined in [2] for WCDMA. With $R_{x_{1,new}}(k)$ and $R_{x_1}(k)$ denoting the aperiodic autocorrelation functions of the sequences $x_{1,new}$ and $x_1$, respectively, the constituent sequence $x_{1,new}$ shall thus be chosen such that:

$$R_{x_{1,new}}(k)+R_{x_1}(k)=C\times\delta(k), k=-15, -14, \ldots 15 \quad (2)$$

In (2) C is a constant integer and $\delta(k)$ represents the Kronecker delta function, i.e. $\delta(0)=1$, otherwise $\delta(k)=0$. The constituent sequence $x_1$ follows from Appendix A1 in [2] as:

$$x_1=\langle 1,1,1,-1,-1,1,-1,-1,1,1,1,-1,1,-1,1,1,1 \rangle \quad (3)$$

The complementary sequence to $x_1$ is:

$$x_{1,new}=\langle 1,1,-1,1,-1,1,1,1,1,1,-1,1,1,-1,-1,-1,1, \rangle \quad (4)$$

The constituent sequence $x_{2,new}$ in (1) is orthogonal to the constituent sequence $x_2$ used to generate the hierarchical sequence used as the PSC for WCDMA and follows from [2]

$$x_2 = \langle 1,1,1,1,1,1,-1,-1,1,-1,1,-1,1,-1,-1,1 \rangle \quad (5)$$

Furthermore, the constituent sequence $x_{2,new}$ in (1) is also orthogonal to the constituent sequence b used to generate the hierarchical sequence used as the SSC's for WCDMA, and follows from [2] as:

$$b = \langle 1,1,1,1,1,1,-1,-1,-1,1,-1,1,-1,1,1,-1 \rangle \quad (6)$$

A list of sequences for $x_{2,new}$ satisfying the above two orthogonality properties is given Table 1 below.

TABLE 1

Candidate sequences for $x_{2,new}$

| | $x_{2,new}$ |
|---|---|
| 1 | <1,-1,1,-1,1,-1,-1,1,1,1,1,1,1,-1,-1> |
| 2 | <1,1,-1,-1,1,1,1,1,1,-1,-1,1,1,-1,1,-1> |
| 3 | <1,-1,-1,1,1,-1,1,-1,1,1,-1,-1,1,1,1> |
| 4 | <1,1,1,1,-1,-1,1,1,1,-1,1,-1,-1,1,1,-1> |
| 5 | <1,-1,1,1,-1,1,1,1,-1,1,1,1,1,-1,-1,1> |
| 6 | <1,1,-1,-1,-1,-1,-1,-1,1,-1,-1,1,-1,1,-1,1> |
| 7 | <1,-1,-1,1,-1,1,-1,1,1,1,-1,-1,-1,-1,-1> |
| 8 | <1,-1,1,-1,1,-1,-1,1,-1,-1,-1,-1,-1,-1,1,1> |
| 9 | <1,1,-1,-1,1,1,1,1,1,-1,1,1,-1,-1,1,-1,1> |
| 10 | <1,-1,-1,1,1,-1,1,-1,-1,-1,1,1,-1,-1,-1,-1> |
| 11 | <1,1,1,1,-1,-1,1,1,1,-1,1,1,1,1,-1,-1,1> |
| 12 | <1,-1,1,-1,-1,1,1,-1,-1,-1,-1,-1,1,1,-1,-1> |
| 13 | <1,1,-1,-1,-1,-1,-1,-1,-1,1,1,1,-1,1,-1,-1> |
| 14 | <1,-1,-1,1,-1,1,1,-1,1,-1,-1,1,1,1,1,1,1> |

Any of these sequences can be used to construct the new PSC. The preferred one however is $$x_{2,new} = \langle 1,-1,-1,1,1,-1,1,-1,1,1,-1,-1,1,1,1,1 \rangle \quad (7)$$

as this sequence will have the smallest sidelobes in its cross-correlations with the existing PSC.

Using the two constituent sequences $x_{1,new}$ and $x_{2,new}$ in (1) to generate the PSC code $C_{psc,new}$, we obtain:

$$C_{psc,new} = p * \langle a, a, -a, a, -a, a, a, a, a, a, -a, a, a, -a, -a, -a \rangle \quad (8)$$

where $$a = x_{2,new} = \langle 1,-1,-1,1,1,-1,1,-1,1,1,-1,-1,1,1,1,1 \rangle \quad (9)$$

The leftmost chip in $C_{psc,new}$ corresponds to the chip transmitted first in time.

In the preferred embodiment, the Secondary Synchronization Codes, SSCs, are generated as in the FDD and TDD 3.84 Mcps option. This means that the sequence b above is constructed from the elements of the constituent sequence $x_2$ as described in [2] and [3], in which $a = x_2$. In the third embodiment mentioned above, the SSCs are generated as in the FDD and TDD 3.84 Mcps option, but in this case the sequence b is constructed from the elements of the constituent sequence $x_{2,new}$ used to construct the new PSC.

The procedure described above may be summarized as:
1. Send a new primary synchronization code for MBSFN DOB to facilitate cell search.
2. The new primary synchronization code is orthogonal to existing PSC and SSC of the FDD and TDD option TD-CDMA.
3. The constituent sequence $x_{1,new}$ of the new PSC sequence and that of the PSC of FDD (and 3.84 Mcps TD-CDMA) $x_1$ form a Golay complementary sequence pair.
4. The constituent sequence $x_{2,new}$ of the new PSC is selected to have good aperiodic autocorrelation properties and low aperiodic cross-correlations with existing PSC.

An alternative method of constructing the new PSC, $C_{psc,new}$, of length 256 chips is as follows: The new sequence $C_{psc,new}$ may be constructed from two constituent sequences $x_{1,new}$ and $x_2$, each of length 16 chips, in accordance with:

$$y = x_2 (i \bmod 16) * x_{1,new}(i \text{ div } 16), i = 0 \ldots 255$$

$$C_{psc,new} = p * \langle y(0), y(1), \ldots, y(255) \rangle \quad (10)$$

where p is a complex number providing an arbitrary phase rotation, for example $p = (1+j)$.

The constituent sequence $x_{1,new}$ is chosen as a Golay complementary sequence to the corresponding constituent sequence $x_1$ associated with the PSC defined in [2] for WCDMA. With $R_{x_{1,new}}(k)$ and $R_{x_1}(k)$ denoting the auto-correlation functions of the sequences $x_{1,new}$ and $x_1$, respectively, the constituent sequence $x_{1,new}$ shall thus be chosen such that:

$$R_{x_{1,new}}(k) + R_{x_1}(k) = C \times \delta(k), k = -15, -14, \ldots 15 \quad (11)$$

In (11) C is a constant integer and $\delta(k)$ represents the Kronecker delta function, i.e. $\delta(0) = 1$, otherwise $\delta(k) = 0$. The constituent sequence $x_1$ follows from Appendix A1 in [2] as:

$$x_1 = \langle 1,1,1,-1,-1,1,-1,1,1,1,1,-1,1,-1,1,1,1 \rangle \quad (12)$$

The complementary sequence to $x_1$ is:

$$x_{1,new} = \langle 1,1,-1,1,-1,1,1,1,1,1,-1,1,1,-1,-1,-1 \rangle \quad (13)$$

The constituent sequence $x_2$ in (10) is the same generalized hierarchical sequence used to generate the PSC for WCDMA and follows from [2] as:

$$x_2 = a = \langle 1,1,1,1,1,1,-1,-1,1,-1,1,-1,1,-1,-1,1 \rangle \quad (14)$$

Using the two constituent sequences $x_{1,new}$ and $x_2$ in (10) to generate the PSC code $C_{psc,new}$, we obtain:

$$C_{psc,new} = p * \langle a, a, -a, a, -a, a, a, a, a, a, -a, a, a, -a, -a, -a \rangle \quad (15)$$

where the leftmost chip in $C_{psc,new}$ corresponds to the chip transmitted first in time.

This procedure may be summarized as:
1. Send a new generalized hierarchical Golay sequence $C_{psc,new}$ for MBSFN DOB to facilitate cell search.
2. The new generalized hierarchical Golay sequence $C_{psc,new}$ is orthogonal to PSC and SSC of FDD and the TDD option TD-CDMA.
3. The constituent sequence of the new generalized hierarchical Golay sequence $C_{psc,new}$ and that of the PSC of FDD (and 3.84 Mcps TD-CDMA) form a Golay complementary sequence pair.

Figure 6:
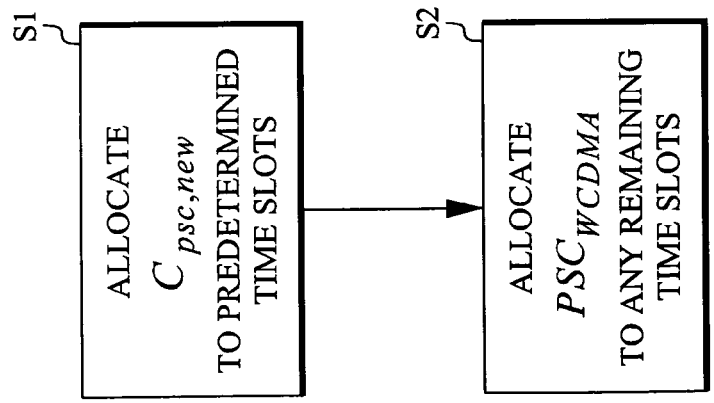
FIG. 6 is a flow chart of an embodiment of a method of generating an MBSFN primary synchronization channel frame in accordance with the present invention.

FIG. 6 is a flow chart of an embodiment of a method of generating an MBSFN primary synchronization channel frame in accordance with the present invention. In step S1 the new PSC $C_{psc,new}$ is allocated to predetermined time slots of a primary synchronization channel frame. In step S2 a primary synchronization code $PSC_{WCDMA}$ used in non-MBSFN capable WCDMA is allocated to any remaining time slots of the frame.

Figure 7:
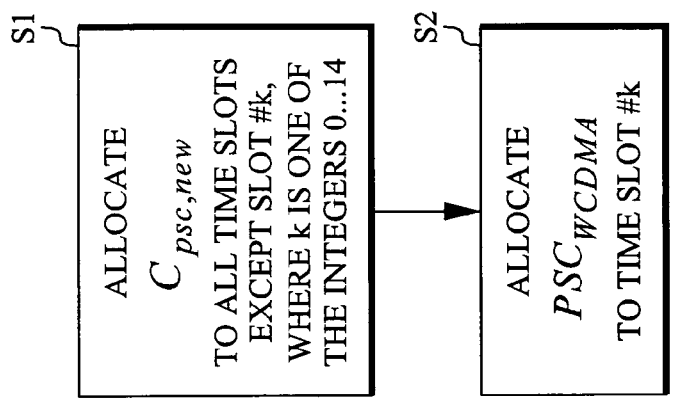
FIG. 7 is a flow chart of another embodiment of a method of generating an MBSFN primary synchronization channel frame in accordance with the present invention.

FIG. 7 is a flow chart of another embodiment of a method of generating an MBSFN primary synchronization channel frame in accordance with the present invention. In step S1 the new PSC $C_{psc,new}$ is allocated to all time slots of a primary synchronization channel frame, except time slot #k, where k is one of the integers 0 . . . 14. In step S2 a primary synchronization code $PSC_{WCDMA}$ used in non-MBSFN capable WCDMA is allocated to time slot #k of the frame.

Figure 8:
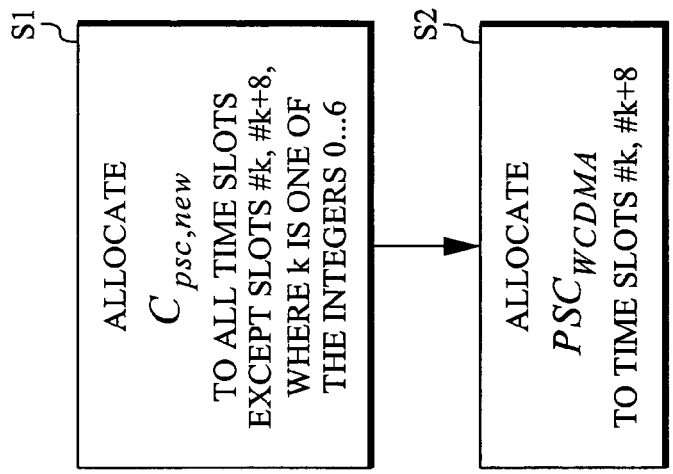
FIG. 8 is a flow chart of still another embodiment of a method of generating an MBSFN primary synchronization channel frame in accordance with the present invention.

FIG. 8 is a flow chart of still another embodiment of a method of generating an MBSFN primary synchronization channel frame in accordance with the present invention. In step Si the new PSC $C_{psc,new}$ is allocated to all time slots of a primary synchronization channel frame, except time slots #k and #k+8, where k is one of the integers 0 . . . 6. In step S2 a primary synchronization code $PSC_{WCDMA}$ used in non-MBSFN capable WCDMA is allocated to time slots #k and #k+8 of the frame.

Figure 9:
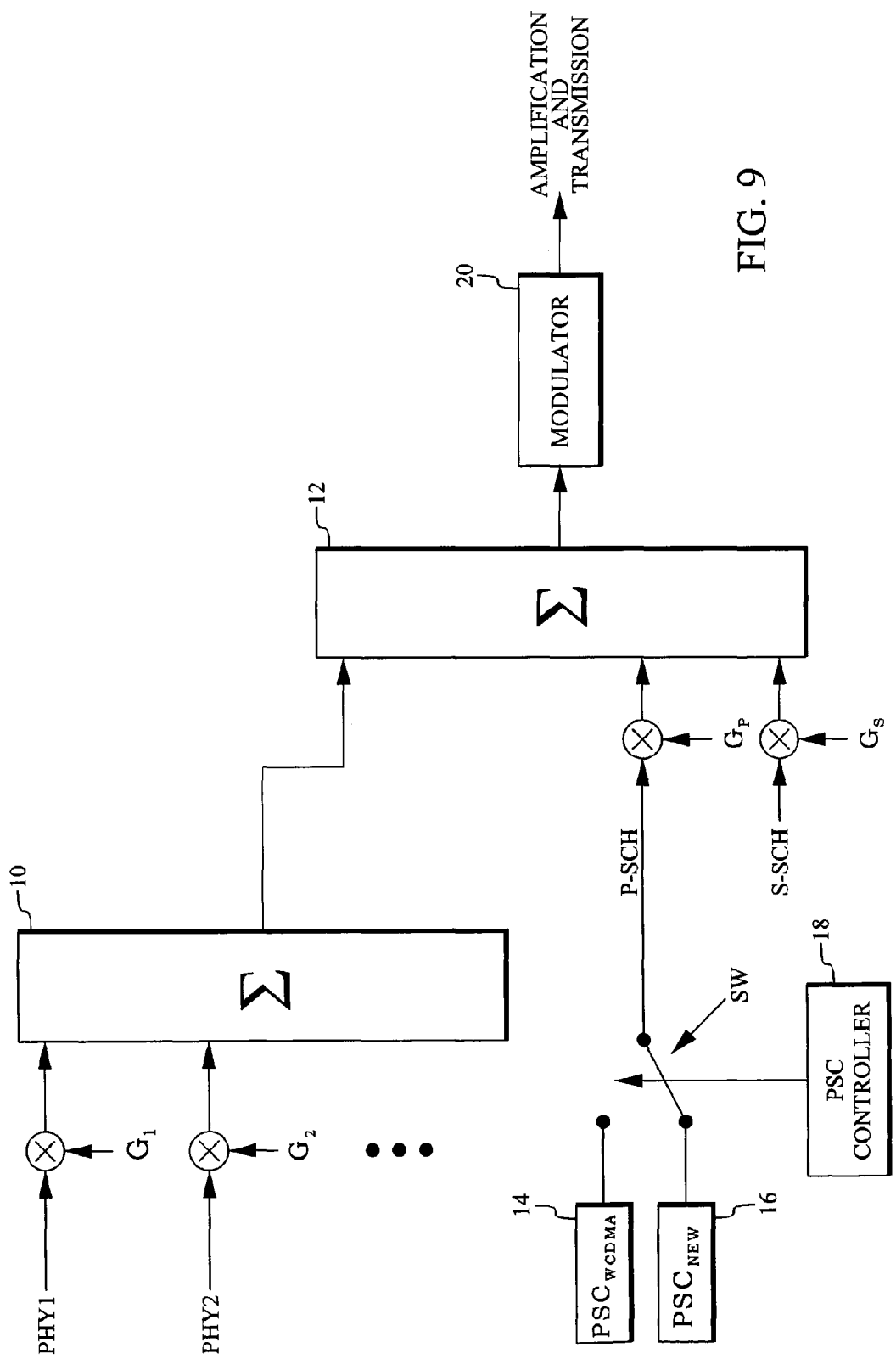
FIG. 9 is a block diagram of part of a base station configured in accordance with an embodiment of the present invention.

FIG. 9 is a block diagram of part of a base station configured in accordance with an embodiment of the present invention. In FIG. 9 only elements necessary to explain the present invention are included. Physical downlink channels PPHY1, PHY2 are summed (after weighting by factors G1 and G2, respectively) in a summation unit 10. The output of summation unit 10 is forwarded to another summation unit 12, where it is combined with the primary and secondary synchronization channels P-SCH, S-SCH (weighted by factors $G_P$ and $G_S$, respectively). The secondary synchronization channel S-SCH is formed as in WCDMA. The primary synchronization channel P-SCH is formed by connecting a switch SW either to a code generator 14 generating the conventional code $PSC_{WCDMA}$ or a code generator 16 generating the code $PSC_{NEW}$. The selection is controlled by a PSC controller 18. This controller can be adapted to produce a P-SCH in accordance with one of the formats above. The output of unit 12 is forwarded to a modulator 20, and the resulting bandpass signal is amplified and transmitted.

As an alternative a single code generator may be dynamically reconfigured to produce the appropriate code, $PSC_{WCDMA}$ or $PSC_{NEW}$.

The functionality of the various blocks is typically implemented by one or several micro processors or micro/signal processor combinations and corresponding software.

It will be understood by those skilled in the art that various modifications and changes may be made to the present invention without departure from the scope thereof, which is defined by the appended claims.

REFERENCES

[1] RP-070493, Work item description of MBSFN Downlink Optimized Broadcast (DOB)
[2] 3GPP TS 25.213, "Spreading and modulation (FDD)" Release 7
[3] 3GPP TS 25.223, "Spreading and modulation (TDD)" Release 7

ABBREVIATIONS

| | |
|---|---|
| BCH: | Broadcast channel |
| DOB: | Downlink Optimized Broadcast |
| FDD | Frequency Division Duplex |
| MBMS: | Multimedia Broadcast Multicast Service |
| MBSFN: | Multicast Broadcast Single Frequency Network |
| PSC: | Primary Synchronization Code |
| SCH: | Synchronization channel |
| SSC: | Secondary Synchronization Codes |
| TD-CDMA | Time Division-Code Division Multiple Access |
| TD-SCDMA | Time Division-Synchronous Code Division Multiple Access |

ABBREVIATIONS

| | |
|---|---|
| TDD | Time Division Duplex |
| UMTS: | Universal Mobile Telecommunications System |
| UTRA: | UMTS Terrestrial Radio Access |
| WCDMA | Wideband Code Division Multiple Access |

The invention claimed is:

1. A method of transmitting a Multicast Broadcast Single Frequency Network (MBSFN) primary synchronization channel frame, said method comprising:
transmitting (S1) a primary synchronization code, denoted $C_{psc,new}$, in predetermined time slots of a primary synchronization channel frame, where $C_{psc,new}$ has the following properties:
$C_{psc,new}$ is a hierarchical Golay sequence constructed by two constituent sequences $x_{1,new}$ and $x_{2,new}$, each of length 16 chips, in accordance with:

$$y(i)=x_{2,new}(i \bmod 16)*x_{1,new}(i \text{ div } 16), i=0 \ldots 255$$
$$C_{psc,new}=p*\langle y(0),y(1),\ldots,y(255)\rangle$$

where
$x_{1,new}$ is a Golay complementary sequence to a corresponding constituent sequence $x_1=\langle 1,1,1,-1,-1,1,-1,-1,1,1,1,-1,1,-1,1,1\rangle$ for generating the primary synchronization code for non-MBSFN capable WCDMA,
$x_{2,new}$ is a sequence that is orthogonal to both a corresponding constituent sequence $x_2 =\langle 1,1,1,1,1,1,-1,-1, 1,-1,1,1,-1,-1,1,1\rangle$ for generating the primary synchronization code for non-MBSFN capable WCDMA and a constituent sequence $b =\langle 1,1,1,1,1,1,-1,-1,-1,1,-1,1,-1,1,1,-1\rangle$ for generating the secondary synchronization codes for non-MBSFN capable WCDMA, and
p denotes a phase rotation represented by a complex number; and
transmitting a primary synchronization code used in non-MBSFN capable WCDMA in any remaining time slots of the frame.

2. The method of claim 1, wherein the primary synchronization code $C_{psc,new}$ is given by
$C_{psc,new}=p*\langle a, a, -a, a, -a, a, a, a, a, a, -a, a, a, -a, -a, -a\rangle$ where a is selected from one of the following 14 sequences:

| | |
|---|---|
| 1 | <1, -1, 1, -1, 1, -1, -1, 1, 1, 1, 1, 1, 1, 1, -1, -1> |
| 2 | <1, 1, -1, -1, 1, 1, 1, 1, 1, -1, -1, 1, 1, -1, 1, -1> |
| 3 | <1, -1, -1, 1, 1, -1, 1, -1, 1, 1, -1, -1, 1, 1, 1, 1> |
| 4 | <1, 1, 1, 1, -1, -1, 1, 1, 1, -1, 1, -1, -1, 1, 1, -1> |
| 5 | <1, -1, 1, -1, -1, 1, 1, -1, 1, 1, 1, 1, -1, -1, 1, 1> |
| 6 | <1, 1, -1, -1, -1, -1, -1, -1, 1, -1, -1, 1, -1, 1, -1, 1> |
| 7 | <1, -1, -1, 1, -1, 1, -1, 1, 1, 1, -1, -1, -1, -1, -1, -1> |
| 8 | <1, -1, 1, -1, 1, -1, -1, 1, -1, -1, -1, -1, -1, -1, 1, 1> |
| 9 | <1, 1, -1, -1, 1, 1, 1, 1, -1, 1, 1, -1, -1, 1, -1, 1> |
| 10 | <1, -1, -1, 1, 1, -1, 1, -1, -1, -1, 1, 1, -1, -1, -1, -1> |
| 11 | <1, 1, 1, 1, -1, -1, 1, 1, -1, 1, -1, 1, 1, -1, -1, 1> |
| 12 | <1, -1, 1, -1, -1, 1, 1, -1, -1, -1, -1, -1, 1, 1, -1, -1> |
| 13 | <1, 1, -1, -1, -1, -1, -1, -1, -1, 1, 1, 1, -1, 1, -1, 1, -1> |
| 14 | <1, -1, -1, 1, -1, 1, 1, -1, 1, 1, -1, -1, 1, 1, 1, 1, 1, 1> |

3. The method of claim 2, wherein the sequence a comprises the sequence
$a=\langle 1,-1,-1, 1,1,-1, 1,-1, 1, 1,-1,-1, 1, 1, 1, 1\rangle$.

4. The method of claim 1 wherein the primary synchronization code $C_{psc,new}$ is allocated to every time slot of the frame.

5. The method of claim 1 wherein the primary synchronization code $C_{psc,new}$ used in non-MBSFN capable WCDMA ($PSC_{WCDMA}$) is allocated to time slot #k of the frame, where k is set to one of the integers 0 . . . 14, and $C_{psc,new}$ is allocated to the remaining time slots of the frame.

6. The method of claim 1 wherein the primary synchronization code used in non-MBSFN capable WCDMA ($PSC_{WCDMA}$) is allocated to time slot #k and #k+8 of the frame, where k is set to one of the integers 0 . . . 6, and $C_{psc,new}$ is allocated to the remaining time slots of the frame.

7. A Multicast Broadcast Single Frequency Network (MBSFN) capable base station comprising:
a code generator configured to generate a primary synchronization code, denoted $C_{psc,new}$, having the following properties:
$C_{psc,new}$ is a hierarchical Golay sequence constructed by two constituent sequences $x_{1,new}$ and $x_{2,new}$, each of length 16 chips, in accordance with:

$y(i) = x_{2,new}(i \bmod 16) * x_{1,new}(i \text{ div } 16), i = 0 \ldots 255$
$C_{psc,new} = p^* \langle y(0), y(1), \ldots, y(255) \rangle$ where
$x_{1,new}$ is a Golay complementary sequence to a corresponding constituent sequence $x_1 = \langle 1,1,1,-1,-1,1,-1,-1,1,1,1,-1,1,-1,1,1 \rangle$ for generating the primary synchronization code for non-MBSFN capable WCDMA,
$x_{2,new}$ is a sequence that is orthogonal to both a corresponding constituent sequence $x_2 = \langle 1,1,1,1,1,1,-1,-1, 1,-1,1,-1,1,-1,-1,1 \rangle$ for generating the primary synchronization code for non-MBSFN capable WCDMA and a constituent sequence $b = \langle 1,1,1,1,1,1,-1,-1,1,-1,1,-1,1,1,-1 \rangle$ for generating the secondary synchronization codes for non-MBSFN capable WCDMA, and
p denotes a phase rotation represented by a complex number; and
a transmitter configured to transmit a synchronization channel frame that includes the primary synchronization code.

8. The base station of claim 7, wherein said code generator is configured to generate a primary synchronization code $C_{psc,new}$ given by $C_{psc,new} = p^* \langle a, a, -a, a, -a, a, a, a, a, a, -a, a, a, -a, -a, -a \rangle$, where a is selected from one of the following 14 sequences:

| | |
|---|---|
| 1 | $\langle 1,-1,1,-1,1,-1,-1,1,1,1,1,1,1,1,-1,-1 \rangle$ |
| 2 | $\langle 1,1,-1,-1,1,1,1,1,1,-1,-1,1,1,-1,1,-1 \rangle$ |
| 3 | $\langle 1,-1,-1,1,1,-1,1,-1,1,1,-1,-1,1,1,1,1 \rangle$ |
| 4 | $\langle 1,1,1,1,-1,-1,1,1,1,-1,1,-1,-1,1,1,-1 \rangle$ |
| 5 | $\langle 1,-1,1,-1,-1,1,1,-1,1,1,1,1,-1,-1,1,1 \rangle$ |
| 6 | $\langle 1,1,-1,-1,-1,-1,-1,-1,1,-1,1,-1,1,-1,1 \rangle$ |
| 7 | $\langle 1,-1,-1,1,-1,1,-1,1,1,1,1,-1,-1,-1,-1,-1 \rangle$ |
| 8 | $\langle 1,-1,1,-1,1,-1,-1,1,-1,-1,-1,-1,-1,-1,1,1 \rangle$ |
| 9 | $\langle 1,1,-1,-1,1,1,1,1,-1,1,1,-1,-1,1,-1,1 \rangle$ |
| 10 | $\langle 1,-1,-1,1,1,-1,1,-1,-1,-1,1,1,-1,-1,-1,-1 \rangle$ |
| 11 | $\langle 1,1,1,1,-1,-1,1,1,-1,1,-1,1,1,-1,-1,1 \rangle$ |
| 12 | $\langle 1,-1,1,-1,-1,1,1,-1,-1,-1,-1,-1,1,1,-1,-1 \rangle$ |
| 13 | $\langle 1,1,-1,-1,-1,-1,-1,-1,-1,1,1,-1,1,-1,1,-1 \rangle$ |
| 14 | $\langle 1,-1,-1,1,-1,1,-1,1,-1,-1,1,1,1,1,1,1 \rangle$ |

9. The base station of claim 8, wherein the sequence a comprises the sequence
$a = \langle 1,-1,-1, 1,1,-1, 1,-1, 1, 1,-1,-1, 1, 1, 1, 1 \rangle$.

10. The base station of claim 7 $C_{psc,new}$ to every time slot of the frame.

11. The base station of claim 7, wherein the transmitter is configured to transmit the primary synchronization code used in non-MBSFN capable WCDMA ($PSC_{WCDMA}$) in time slot #k of the frame, where k is set to one of the integers 0 . . . 14, and $C_{psc,new}$ to the remaining time slots of the frame.

12. The base station of claim 7, wherein the transmitter is configured to transmit the primary synchronization code used in non-MBSFN capable WCDMA ($PSC_{WCDMA}$) to time slot #k and #k+8 of the frame, where k is set to one of the integers 0 . . . 6, and $C_{psc,new}$ to the remaining time slots of the frame.

* * * * *

UNITED STATES PATENT AND TRADEMARK OFFICE
CERTIFICATE OF CORRECTION

PATENT NO. : 8,400,905 B2
APPLICATION NO. : 12/808784
DATED : March 19, 2013
INVENTOR(S) : Lindbom et al.

It is certified that error appears in the above-identified patent and that said Letters Patent is hereby corrected as shown below:

In the Specification

In Column 4, Lines 45-47, in Equation (1), delete "
$$y(i) = x_{2,new}(i \bmod 16) * x_{1,new}(i \operatorname{div} 16), i = 0 \ldots$$
$$255 C_{psc,new} = p * (y(0), y(1), \ldots, y(255))$$
" and insert --
$$y(i) = x_{2,new}(i \bmod 16) * x_{1,new}(i \operatorname{div} 16), \quad i = 0 \ldots 255$$
$$C_{psc,new} = p * (y(0), y(1), \ldots, y(255))$$
--, therefor.

In Column 4, Line 67, in Equation (4), delete " $-1.)$ " and insert -- $-1)$ --, therefor.

In Column 5, Line 40, delete " $x_{1,new}$ " and insert -- $x_{1,new}$ --, therefor.

In Column 6, Line 5, delete " $x_{2,new}$ " and insert -- $x_{2,new}$ --, therefor.

In Column 6, Line 14, in Equation (10), delete "y=" and insert -- y (i)= --, therefor.

In Column 7, Line 29, delete "14" and insert -- 16 --, therefor.

In the Claims

In Column 9, Line 17, in Claim 7, delete " $x_{2,new}$, " and insert -- $x_{2,new}$, --, therefor.

Signed and Sealed this
Thirteenth Day of August, 2013

Teresa Stanek Rea
*Acting Director of the United States Patent and Trademark Office*

In Column 9, Lines 19-20, in Claim 7, delete "$y(i)=x_{2,new}(i \bmod 16)*x_{1,new}(i \text{ div } 16), i=0\ldots$
$255 C_{psc,new}=p*\big(y(0),y(1),\ldots,y(255)\big)$" and insert -- $y(i) = x_{2,new}(i \bmod 16) * x_{1,new}(i \text{ div } 16), \quad i = 0\ldots 255$
$C_{psc,new} = p*\big(y(0),y(1),\ldots,y(255)\big)$ --, therefor.